United States Patent [19]

Höscheler

[11] Patent Number: 5,048,295
[45] Date of Patent: Sep. 17, 1991

[54] HYDROSTATIC TRANSMISSION

[75] Inventor: Arnulf Höscheler, Ulm, Fed. Rep. of Germany

[73] Assignee: Hydromatik GmbH, Elchingen, Fed. Rep. of Germany

[21] Appl. No.: 324,240

[22] Filed: Mar. 15, 1989

[30] Foreign Application Priority Data

Apr. 13, 1988 [DE] Fed. Rep. of Germany ....... 3812300

[51] Int. Cl.$^5$ ............................................. F16D 31/02
[52] U.S. Cl. ...................................... 60/461; 60/459; 60/464; 60/466; 60/489; 60/494
[58] Field of Search .................. 60/459, 460, 461, 464, 60/466, 413, 494, 489; 91/421

[56] References Cited

U.S. PATENT DOCUMENTS

| 2,415,603 | 2/1947 | Muller et al. | 60/466 |
| 2,632,301 | 3/1953 | Brodie | 60/466 |
| 2,655,000 | 10/1953 | Vestre | 60/460 |
| 3,218,797 | 11/1965 | Jennings | 60/459 |
| 3,635,021 | 1/1972 | McMillen et al. | 417/222 |
| 3,999,386 | 12/1976 | Crull et al. | 60/494 |
| 4,713,936 | 12/1987 | Barber et al. | 60/459 |

FOREIGN PATENT DOCUMENTS 1372809 11/1974 United Kingdom .................. 91/421

Primary Examiner—Edward K. Look
Assistant Examiner—Christopher M. Verdier
Attorney, Agent, or Firm—Scully, Scott, Murphy & Presser

[57] ABSTRACT

In a hydrostatic transmission comprising a pump and a hydraulic motor arranged in a main line having low pressure and high pressure sections, wherein an oil drain line of the hydraulic motor is connected to the low pressure section of the main line, the housing of the hydraulic motor is freed from excessively high pressures in the main line by arranging a valve having an adjustable passage cross-section which decreases with increasing pressure in the main line before—in the direction of flow—the line connection of the oil drain line.

16 Claims, 2 Drawing Sheets

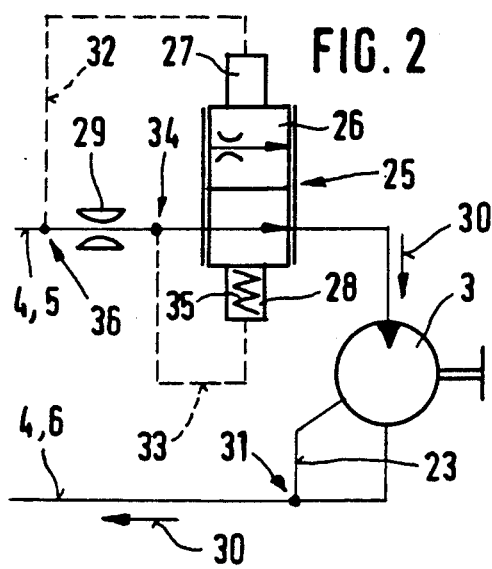
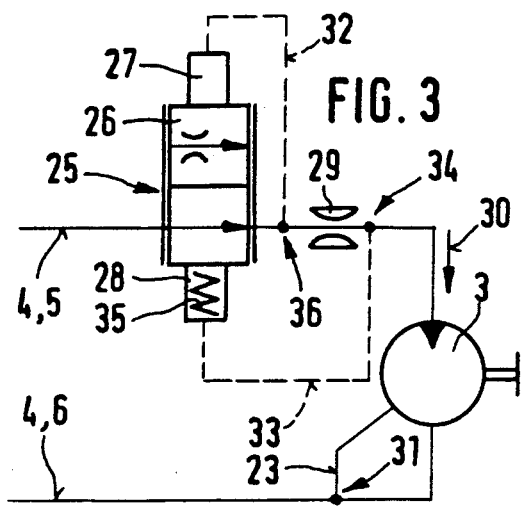
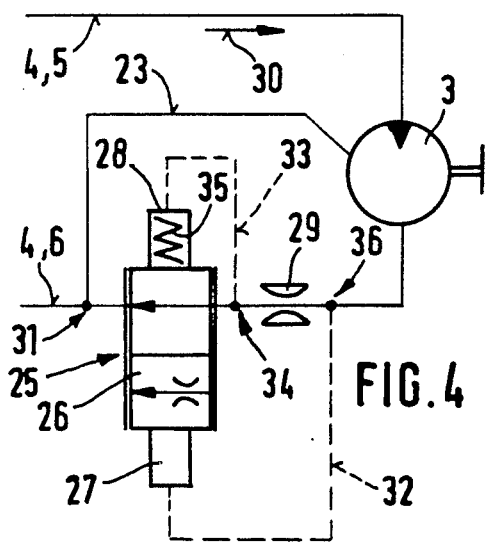
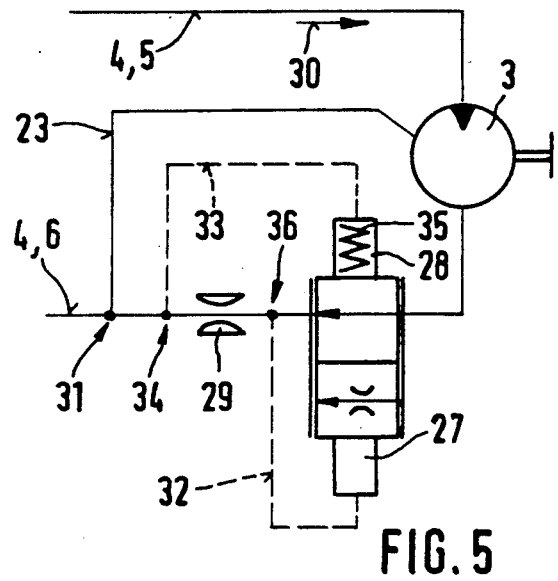
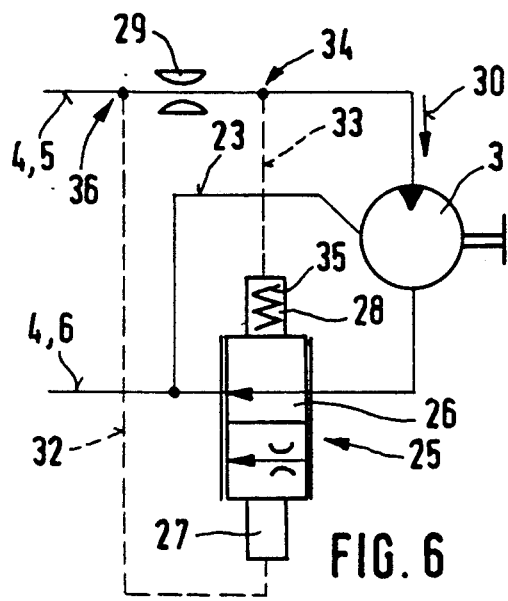

HYDROSTATIC TRANSMISSION

TECHNICAL FIELD OF THE INVENTION

The invention relates to a hydrostatic transmission according to the preamble of claim 1.

BACKGROUND OF THE INVENTION AND PRIOR ART

In a hydrostatic transmission cold starting difficulties can occur if the hydraulic medium flowing in the hydraulic circuit of the hydrostatic transmission undercools and therefore becomes viscous. These difficulties increase with increasing distance between the pump and hydraulic motor, i.e. with increasing length of the main line in which the pump and the hydraulic motor are arranged.

With increasing length of the main line a further problem arises in the return of leakage from the hydraulic motor to the tank. To avoid a long leakage or drain line extending from the hydraulic motor up to the neighbourhood of the pump it has already been proposed to connect the leakage or drain line of the hydraulic motor to the low pressure section of the main line. In such an arrangement overloading and operating difficulties of the hydraulic motor are to be expected if an increase in pressure occurs in the low pressure line, which can likewise be caused by cold, e.g. by at least local "freezing" of the low pressure line, since the viscosity of the operating fluid, the delivery flow and the line resistance determine the pressure in the return line and thus also the pressure in the housing of the hydraulic motor. For constructional reasons, and having regard to the seals of the hydraulic motor, e.g. a shaft seal, the maximum permissible pressure head is very limited. In order to prevent excessively high pressures the viscosity values of the operating fluid must be selected in relation to the operating and ambient temperatures that occur. In the case of extremely low temperatures and in the case of high line resistances this is in most cases not enough and, in particular in starting processes, the operating fluid has to be heated up accordingly before operation at nominal power is possible. It would, e.g. be possible to heat up the operating fluid before starting by means of a separate heating device.

A by-pass circuit has also been proposed comprising a valve chain arranged in a bypass connecting the high pressure line and the low pressure line to one another, having a pressure relief valve that is set so that, having regard to the maximum permissible return pressure, only a fraction of the normal delivery flow circulates in the main line. The circuit can be heated up by the heat arising from energy losses at the pressure relief valve.

These means are disadvantageous for the following reasons: Generally, only the existing transmission container for the hydraulic fluid is suitable for the preheating. Hence the hydraulic fluid in the main line is not included in the heating and therefore there is the danger that when starting the pressure in the low pressure line, and thus also the pressure in the housing of the hydraulic motor, may rise to an excessively high value at which damage to the hydraulic motor may occur.

OBJECT OF THE INVENTION

It is the object of the invention to design a hydrostatic transmission of the kind described in the introduction so that the housing of the hydraulic motor is freed from excessively high pressures in the main line.

SUMMARY OF THE INVENTION

This object is achieved by the characterising features of claim 1.

In the arrangement according to the invention the circuit is throttled at a point before—in the direction of flow—the line connection for the oil drain line of the hydraulic motor if the pressure in the main line, which can affect the oil leakage or drain line and the motor housing through the low pressure line, exceeds a predetermined value. It is possible within the scope of the invention to adjust the flow cross-section of the valve depending either on the pressure or on the temperature in the main line. The last measure likewise leads to an advantageous solution because at low temperatures the viscosity of the hydraulic fluid increases, which also leads to the problems described in the introduction and is often the cause of these problems. The valve can be controlled electrically, hydraulically or mechanically. As soon as the pressure drops or the temperature of the hydraulic medium rises the valve is opened, preferably continuously, or its flow cross-section is continuously enlarged. In normal operation, i.e. with normal pressure ratios or with normal outside temperatures or after warming up the transmission, throttling can be stopped completely.

In the arrangement according to the invention a harmful high pressure in the region of the line connection of the oil drain line cannot occur since the valve according to the invention throttles or stops the supply of hydraulic fluid to the line connection and a harmful high pressure cannot result. According to claims 2 to 5 the valve can be arranged before the line connection for the oil drain line and both in the high pressure line and in the low pressure line where, according to claim 3, it is proposed, for reasons of simple and operatively reliable construction, to arrange the valve near the hydraulic motor.

The arrangement according to claim 6 contributes to further simplification of the arrangement according to the invention in that there is automatic adjustment of the valve, namely in particular without additional control signals from the region of the pump so that long control lines between the region in which the pump is arranged and the valve are not necessary either.

In the arrangement according to claim 7 the valve body of the valve is acted on depending on the pressure drop over a preferably constant throttle, which can be arranged either in the high pressure line or in the low pressure line and either before or after the valve. It is important that the throttle is arranged before—in the direction of flow—the line connection of the oil drain line so that a harmful high pressure in the low pressure line cannot have an effect in the oil drain passage and thus not in the housing of the hydraulic motor.

The arrangement according to claim 12 is advantageous for constructional and operating reasons.

According to claim 13 circulation of the hydraulic fluid in the main line while maintaining a specific working pressure is ensured even if the main line should be blocked or the flow hindered after the bypass. Heating up occurs at the throttle of the valve and/or at the throttle of the pressure relief valve which can advantageously be used to heat up the hydraulic fluid if there are cold starting difficulties.

The arrangement according to the invention is suitable for both an open circuit and preferably for a closed circuit.

Since the part of the transmission comprising the pump and the part comprising the hydraulic motor are independent the arrangement according to the invention is particularly suitable for uses in which the above-mentioned transmission parts are connected to one another only by the high pressure line and the low pressure line in the form of flexible lines such as hoses. In such a case the part of the transmission comprising the hydraulic motor can be displaced independently of the part comprising the pump. A preferred use for a hydrostatic transmission designed according to the invention is in ships, since even with a large distance between the pump and the hydraulic motor practical arrangement and operation of the part of the transmission comprising the hydraulic motor is possible. It is possible to throw overboard the transmission part comprising the hydraulic motor when it is used to drive a fire-fighting water pump on a ship in order to bring the water pump driven by the hydraulic motor, which can form a unit with the hydraulic motor and the particular components according to the invention, into contact with the water carrying the ship: owing to the arrangement according to the invention overloading of the hydraulic motor and operating difficulties can be avoided even when cold. After use the transmission part comprising the hydraulic motor can be pulled on board again and be stored using little space.

BRIEF DESCRIPTION OF THE DRAWINGS

The invention will now be explained in more detail with reference to preferred exemplary embodiments shown in simplified drawings, in which

FIGS. 2 to 6 show modifications of the hydrostatic transmission.

DETAILED DESCRIPTION OF PREFERRED EMBODIMENTS OF THE INVENTION

Figure 1:
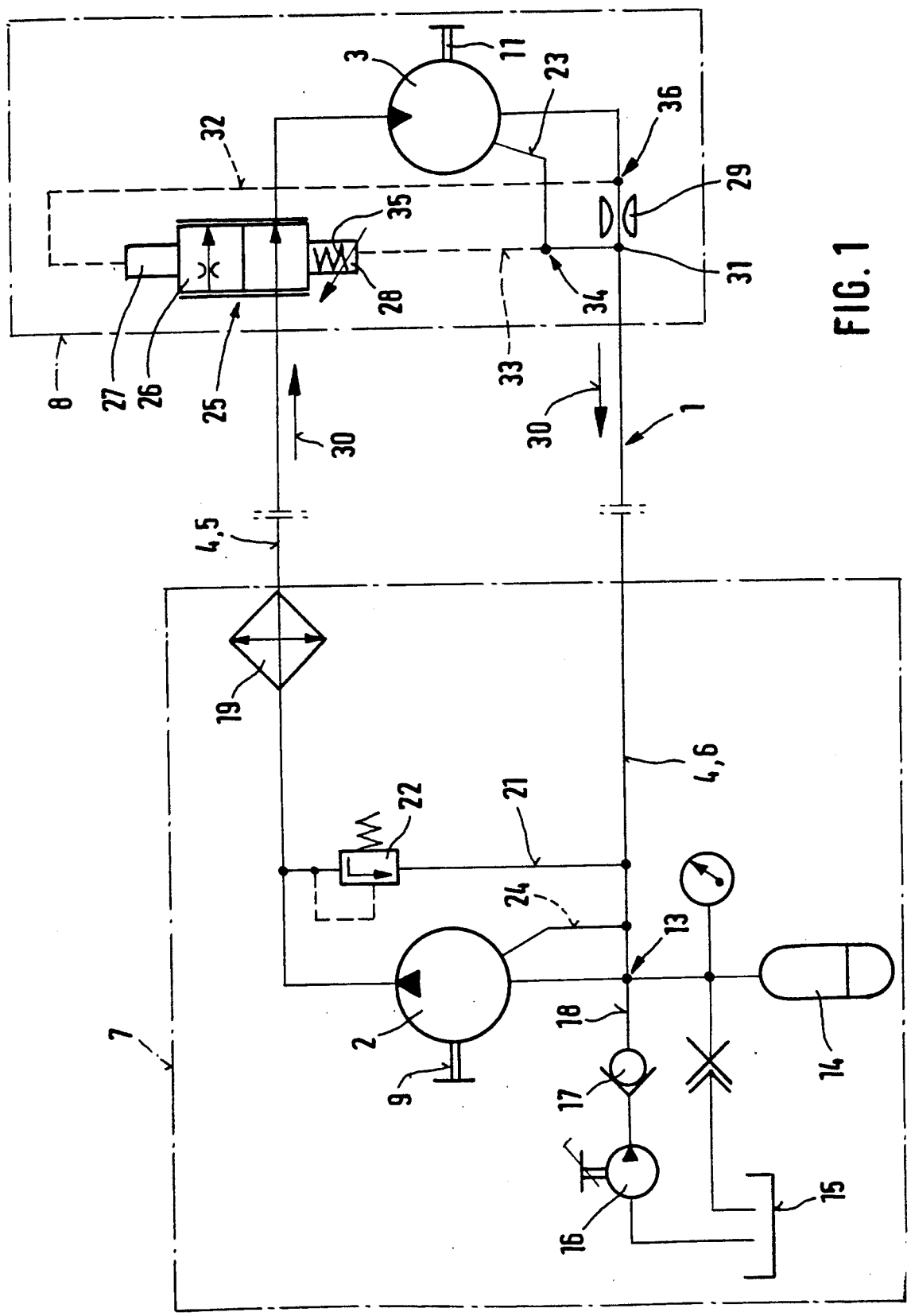
FIG. 1 shows a control diagram for a hydrostatic transmission designed according to the invention.

The hydrostatic transmission indicated generally by 1 in FIG. 1 comprises in the usual way a pump 2 and a hydraulic motor 3 in the form of axial piston machines which are placed in a main line of a closed circuit, indicated generally by 4, of which—depending on the direction of flow (arrow)—the section leading from the pump 2 to the hydraulic motor 3 is the high pressure line 5 and whose section leading from the pump 2 to the hydraulic motor 3 is the low pressure line 6. The part of the transmission comprising the pump 2 is indicated by 7 and the part of the transmission comprising the hydraulic motor 3 is indicated by 8. The transmission parts 7, 8 preferably form two independent parts positioned apart from one another and connected to one another only by the high pressure line 5 and the low pressure line 6 in the form of flexible hydraulic lines of plastic material or metal.

In the present exemplary embodiment the pump 2 and the hydraulic motor 3 are axial piston machines having constant stroke volume which are adapted to operate in only one direction of rotation. The pump 2 is driven by a driving motor (not shown) by means of an input shaft 9. Associated with the hydraulic motor 3 is an output shaft 11 by which an actuator, such as a working machine or a running gear or chassis unit, can be driven.

The closed circuit of the hydrostatic transmission 1 is connected in the region of the low pressure line 6 near the pump 2 to a hydraulic accumulator 14 through which the system is preloaded. The accumulator 14 is charged via a filling device having a pump 16 sucking from an oil container 15 and a pressure relief valve 17 closing towards the pump 16, which are arranged in a hydraulic line section 18 and at 13 are likewise connected to the low pressure line 6. Arranged in the high pressure line 5 is a heat exchanger 19 by means of which the heat due to energy losses in operation is removed in a manner not shown. Near the pump 2, extending between the high pressure line 5 and the low pressure line 6, is a bypass line 21 in which a pressure relief valve 22 is arranged.

The hydraulic motor 3 and the pump 2 are connected to the low pressure line 6 by means of oil drain lines 23, 24 through which the removal of the leakage oil into the low pressure line 6 is ensured.

In order to prevent during cold temperatures a high and therefore harmful pressure that may build up in the low pressure line 6 owing to low viscosity from acting, via the oil drain line 23, on the housing of the hydraulic motor 3 from inside, a throttle valve 25 is arranged in the high pressure line 5 near the hydraulic motor 3 whose valve spool 26 can be acted on on its two end faces by respective hydraulic cylinders 27, 28 which are associated with the housing of the throttle valve 25. The loading of the valve spool 26 depends on the pressure differential before and after a constant throttle 29 which is arranged in the low pressure line 6 before—in the direction of flow (arrow 30)—the line connection 31 through which the oil drain line 23 is connected to the low pressure line 6. Before and after the constant throttle 29 there are lines 32, 33 extending from the low pressure line 6, of which the line indicated by 32 carrying the higher pressure of the pressure differential is connected to the hydraulic cylinder 27 and the line indicated by 33 carrying the lower pressure of the pressure differential is connected to the hydraulic cylinder 28. The line 33 is connected at 34 to the oil drain line 23, but the pressure obtaining after the constant throttle 29 is effective both in the oil drain line 23 and in the line 33. Associated with the hydraulic cylinder 28 is a compression spring 35 whose spring force can be adjusted. Thus, the higher pressure of the pressure differential acts against the compression spring 35. The valve spool 26 can be adjusted inversely proportional to the pressure obtaining in the region of the constant throttle 29, i.e. it can be adjusted continuously between a maximum and minimum setting.

The hydrostatic transmission 1 described above is preferably intended for use as the drive of a ship's fire-fighting water pump (not shown) which is driven by the hydraulic motor 3 and preferably forms a unit, in particular in the form of a block, with the hydraulic motor 3, the throttle valve 25 and the constant throttle 29. Since the high pressure line 5 and the low pressure line 6 are in the form of flexible lines, preferably of plastics material, the basic construction unit indicated by 38 can be thrown overboard in a simple manner in order to bring the fire-fighting water pump in contact with the water in which the ship is located. Since the oil drain line 23 is connected to the low pressure line 6 no special lines leading back to the unit 7 including the pump are required: in the present case such lines would have to be very long, e.g. 20 m or more, which would increase the manufacturing costs considerably and make operation difficult.

The function of the hydrostatic transmission 1 will now be described. The driven pump 2 conveys the hydraulic fluid present in the main line 4 in the direction of the arrow 30 to drive the hydraulic motor 3. If there is an increase in pressure to a predeterminable value, e.g. owing to high viscosity in the low pressure line 6 resulting from cold, the valve spool 26 is automatically displaced hydraulically into a throttle setting through which in the present exemplary embodiment the delivery to the hydraulic motor 3 is throttled so that the predeterminable pressure in the low pressure line 6 is not exceeded. The transition between the function settings of the valve spool 26 occurs with regard to the throttle effect almost continuously, i.e. with increasing pressure in the low pressure line 6 the throttle valve 25 is closed and with decreasing pressure it is opened. The pressure differential between the control lines 32, 33 corresponds to the fall in pressure at the constant throttle 29 which occurs depending on the quantity of flow and the viscosity of the operating fluid. The fall in pressure at the constant throttle 29 thus varies proportionally to the fall in pressure in the whole low pressure line 6 and serves as control variable for the setting of the valve spool 26. If during the starting process, in particular owing to high temperature, the viscosity is so low that even at full flow of the pump 2 the permissible fall in pressure in the low pressure line 6 is not exceeded, the analogous corresponding fall in pressure at the constant throttle 29 is not able to move the valve spool 26 against the effect of the compression spring 35 from its setting for free passage; if however the viscosity is too high, e.g. owing to low temperature, the pressure differential at the constant throttle 29 forces the valve spool 26 into a throttle position which reduces the inflow to the hydraulic motor 3 and thus compensates for the effect of the too high viscosity in causing an increase in pressure in the low pressure line 6. The part of the delivery not taken up by the hydraulic motor 3 flows away through the pressure relief valve 22 under maximum operating pressure. The maximum throttle effect of the valve spool 26 is defined by the maximum permissible operating viscosity and by the delivery flow, which under the given system pressure—determined by the pressure relief valve—brings about the maximum permissible pressure in the low pressure line 6. As long as the valve spool 26 has not switched to free passage the transmission is in the cold starting position. The energy not taken up by the hydraulic motor 3 is completely converted to heat at the throttle point of the pressure relief valve 22 and the effective energy, which flows to the hydraulic motor 3, is partly converted to heat at the throttle point of the throttle valve 25 and thereby serves to quickly heat up the circuit. During the cold starting process the complete input power is always automatically taken up by the hydraulic pump 2 because the throttle valve 25 does not let the whole flow pass and thus a part of the flow must flow off via the pressure relief valve 22 under the highest system pressure. This system pressure determines the level of the power input. The torque simultaneously delivered at the hydraulic motor 3 does not determine the operating pressure of the hydraulic pump 2 in this phase.

In FIGS. 2 to 6 advantageous alternatives for the arrangement of the throttle valve 25 and the constant throttle 29 are shown. In the exemplary embodiment shown in FIG. 2 the constant throttle 29 and the line connections 34, 36 for the control lines 32, 33 are located in the high pressure line 5, namely before the throttle valve 25. In comparison thereto the constant throttle 29 and the line connections 31, 34 in the exemplary embodiment shown in FIG. 3 are, it is true, likewise in the high pressure line 5 but are after—in the direction of flow—the throttle valve 25, i.e. between the latter and the hydraulic motor 3. In each of the three arrangements described above the hydraulic motor 3 is supplied with the respective throttled flow capacity.

In the exemplary embodiments shown in FIGS. 4 to 6 the throttle valve 25 is located in the low pressure line 6, namely before—in the direction of flow—the line connection 31 for the oil drain line 23, and the constant throttle 29 and the line connections 34, 36 for the control lines 32, 33 can be arranged before—in the direction of flow—the throttle valve 25, i.e. between the latter and the hydraulic motor 3 (FIG. 4), or after—in the direction of flow—the throttle valve 25, i.e. between the latter and the line connection 31 for the oil drain line 23 (FIG. 5), or in the high pressure line 5 (FIG. 6).

Within the scope of the invention it is also possible to arrange the valve spool 26 to be adjustable between only two function settings (open, closed or throttled).

Thus, in all exemplary embodiments the flow capacity is throttled before the line connection 31 for the oil drain line 23 so that harmful pressure cannot build up in the low pressure line 6, i.e. at least in the region of the line connection 31 for the oil drain line 23.

What is claimed is:

1. Hydrostatic transmission comprising a main line for a flow of hydraulic fluid; said main line having low pressure and high pressure flow sections; a pump and a hydraulic motor arranged in said main line; an oil drain line of said hydraulic motor being connected with said low pressure section; a control valve arranged in said main line upstream of the connection of said oil drain line to said low pressure section for controlling the flow of the hydraulic fluid to said hydraulic motor in response to the hydraulic pressure reigning in said main line, said control valve being a throttling valve (25) having a passage of adjustable cross-section and two ports respectively connected with said pump (2) and said hydraulic motor (3), said control valve reducing the flow of the hydraulic fluid responsive to an increasing pressure or decreasing temperature of the hydraulic fluid; a throttling pressure relief valve (22) located in a bypass (21) intermediate said high and low pressure sections (5,6), said control valve cooperating with said throttling pressure relief valve such that the throttling effect of said pressure relief valve reduces with increasing throttling effected by said control valve; and a valve body (26) of said control valve (25) being acted upon by an increased throttling effect of the hydraulic pressure in the direction of flow upstream of a throttle (29) arranged in said main line (4).

2. Hydrostatic transmission according to claim 1, wherein said control valve controls the flow of the hydraulic fluid in response to the hydraulic pressure in said main line (4) upstream of said connection (32) of said oil drain line (23) with said main line.

3. Hydrostatic transmission according to claim 1, wherein said control valve is located closer to said hydraulic motor than to said pump.

4. Hydrostatic transmission according to claim 3, wherein said control valve is located within a unit (38) comprising said hydraulic motor.

5. Hydrostatic transmission according to claim 1, wherein said control valve is located in said high pressure section of said main line.

6. Hydrostatic transmission according to claim 1, wherein said control valve is located in said low pressure section of said main line.

7. Hydrostatic transmission according to claim 1, wherein said valve body is acted upon by the pressure upstream of said throttle opposite the biasing pressure of a spring (35).

8. Hydrostatic transmission according to claim 1, wherein said valve body is acted upon into the direction of reduced throttling effect by the hydraulic pressure downstream of said throttle.

9. Hydrostatic transmission according to claim 1, wherein said throttle is located in the high pressure section of said main line.

10. Hydrostatic transmission according to claim 1, wherein said throttle is located in the low pressure section of said main line intermediate said hydraulic motor and said line connection for said oil drain line.

11. Hydrostatic transmission according to claim 1, wherein said throttle is located in said main line upstream of said control valve.

12. Hydrostatic transmission according to claim 1, wherein said throttle is located in said main line downstream of said control valve.

13. Hydrostatic transmission according to claim 1, wherein said throttle is located with a unit (38) comprising said hydraulic motor.

14. Hydrostatic transmission according to claim 1, wherein the connections (34, 36) of said control valve to said throttle are located within a unit (38) comprising said hydraulic motor.

15. Hydrostatic transmission according to claim 1, wherein an oil drain line connects said pump to said low pressure section of the main line.

16. Hydrostatic transmission according to claim 1, wherein said main line connects said pump and the said hydraulic motor in a closed hydraulic flow circuit.

* * * * *